United States Patent
Ono et al.

(10) Patent No.: US 8,425,212 B2
(45) Date of Patent: Apr. 23, 2013

(54) POSITIVE DISPLACEMENT FLOWMETER AND HELICAL GEAR

(75) Inventors: Seigo Ono, Shinjyuku-ku (JP); Katsuichi Uchida, Shinjyuku-ku (JP)

(73) Assignee: Oval Corporation, Tokyo (JP)

( * ) Notice: Subject to any disclaimer, the term of this patent is extended or adjusted under 35 U.S.C. 154(b) by 358 days.

(21) Appl. No.: 12/735,642

(22) PCT Filed: May 23, 2008

(86) PCT No.: PCT/JP2008/059504
§ 371 (c)(1),
(2), (4) Date: Aug. 4, 2010

(87) PCT Pub. No.: WO2009/110108
PCT Pub. Date: Sep. 11, 2009

(65) Prior Publication Data
US 2010/0307234 A1 Dec. 9, 2010

(30) Foreign Application Priority Data
Mar. 3, 2008 (JP) .................................. 2008-052117

(51) Int. Cl.
*F01C 21/00* (2006.01)
*F03C 2/00* (2006.01)
*F03C 4/00* (2006.01)

(52) U.S. Cl.
USPC ...................................... 418/150; 418/201.3

(58) Field of Classification Search .................. 418/150, 418/201.1, 201.3, 206.1–206.9; 73/261
See application file for complete search history.

(56) References Cited

U.S. PATENT DOCUMENTS

| 4,210,410 | A |   | 7/1980 | Ohtani |
| 4,224,015 | A | * | 9/1980 | Nagata ............................ 418/150 |
| 4,329,130 | A | * | 5/1982 | Nagata et al. .................. 418/150 |

FOREIGN PATENT DOCUMENTS

| JP | 41-6645 | 4/1966 |
| JP | 54-073305 | 6/1979 |

(Continued)

OTHER PUBLICATIONS

Faydor L. Litvin et al.: "Generation of planar and helical elliptical gears by application of rack-cutter, hob, and shaper", ScienceDirect, May 13, 2007, XP002630983, Retrieved from the Internet: URL:http://www.sciencedirect.com/science?ob=MImg&_imagekey=B6V29-4NR1882-5-1N&_cdi=5697&_user = 987766&_pii=S0045782507001971&_origin=gateway&_coverDate=09%2F01%2F2007&_sk=998039958&view=c&wchp=dGLzVlz-zKKzV&md5=9adb7dd3e332e5d76986da79719056ee&ie=/sdarticle.pdf [retrieved on Apr. 1, 2011].

*Primary Examiner* — Theresa Trieu
(74) *Attorney, Agent, or Firm* — Jordan and Hamburg LLP

(57) ABSTRACT

Flowmeter with a pair of helical gears using an oval pitch curve as a reference rack tooth profile. The tooth height ratio of the reference rack tooth profile is $\pi/4$. The reference rack tooth profile is an oval pitch curve of two or less leaves. The moving radius of the oval pitch curve is expressed by $\rho=a/(1-b\cos n\theta)$, where $\rho$ is a moving radius which is a distance between the center of rotation and the oval pitch curve, "a" is a similarity factor, "b" is a degree of flatness, n ($n \leq 2$) is the number of leaves, and $\theta$ is an argument. The tooth height ratio is $h=a/(1-b)-g_0$, where $g_0$ is a distance between poles of the oval pitch curve and pitch line, wherein $g_0 = a\cos\theta_0/(1-b\cos n\theta_0)$. Values for the similarity factor "a", degree of flatness "b", and distance $g_0$ are determined so that the tooth height ratio may be $\pi m/4$.

11 Claims, 7 Drawing Sheets

FOREIGN PATENT DOCUMENTS

| JP | 62-013866 | 1/1987 |
| JP | 2000-346689 | 12/2000 |
| JP | 2001-027560 | 1/2001 |
| JP | 3310239 | 5/2002 |

* cited by examiner

POSITIVE DISPLACEMENT FLOWMETER AND HELICAL GEAR

TECHNICAL FIELD

The present invention relates to a positive displacement flowmeter and a helical gear and more specifically to a pair of helical gears that employ an oval pitch curve as their reference rack tooth profile, and a positive displacement flowmeter that includes the pair of helical gears.

BACKGROUND OF THE INVENTION

Conventionally, a helical-gear positive displacement flowmeter is characterized in that the flow meter generates a very small amount of vibrations and noises due to its non-pulsing motion because rotations of its gear are uniform-velocity rotations, its flow is uniform, and its torque is uniform, compared with other gear flow meters. In a gear having relatively a few teeth (the number of teeth Z is 2 to 4) as its gear, the continuous contact tooth profile with which meshing is conducted on the whole surface of the gear tooth profile accompanies no confinement phenomenon, is proper as a tooth profile for a gear of a flow meter, and is variously used in practice.

For example, the tooth profile of a helical-gear positive displacement flowmeter described in Patent Document 1 is a one-point continuous contact tooth profile that employs an involute curve (cutter pressure angle $\alpha_0 \geq 21.3°$) as its reference rack tooth profile, however, the tooth height ratio h in the normal case (in the case of a single curve) is h≈0.665 m ("m" represents "module") and, even for a combined curve that is formed by connecting the vicinity of a pitch point by a straight line with the cutter pressure angle $\alpha_0$ at the pitch point being $\alpha_0=15°$, the tooth height ratio h is h≈0.724 m. The maximum of the height $h_0$ of the straight line in this case is $h_0=Z \sin^2 \alpha_0/2$.

Therefore, the tooth height ratio of this tooth profile is lower than the tooth height ratio h that is h=π m/4=0.7854 m that is the limit tooth height ratio for the one-point continuous contact tooth profiles and, therefore, no tooth height larger than this can be obtained.

A cycloid tooth profile is characterized in that its specific sliding is constant, but the limit of its tooth height ratio h is h=0.5 m to cause the cutter pressure angle at the pitch point to be zero and to form a one-point continuous contact tooth profile using a single curve. However, although a straight line may be inserted in the vicinity of the pitch point to avoid the cutter pressure angle at the pitch point from being zero, the limit of the tooth height ratio h is h=0.5 m to establish the cycloid tooth profile as a one-point continuous contact tooth profile.

As to an arc tooth profile that is generally called Novikov tooth profile, the largest tooth height ratio h that is h=π m/4=0.7854 m of one-point continuous contact tooth profiles may be obtained when the center of the arc is put at the pitch. However, the tooth height ratio h is h=0.6081 m when the cutter pressure angle $\alpha_0$ at the pitch point is $\alpha_0=14.5°$ by shifting the center of the arc because the cutter pressure angle at the pitch point in this case is zero similarly to the case of the cycloid tooth profile. It is also possible to increase the tooth height ratio by inserting a straight line in the vicinity of the pitch point. In this case, the range of the height of the straight line must satisfy a condition that is $0 \leq h_0 \leq Z \sin^2 \alpha_0/2$ and the cutter pressure angle $\alpha_0$ in this case is about $\alpha_0 \geq 21.5°$.

In the above, the height $h_0$ of the straight line is estimated as $h_0=0.2678$ by assuming that the cutter pressure angle $\alpha_0$ of the straight line is $\alpha_0 \geq 21.5°$, satisfies the maximum of the height of the straight line that is $h_0=0.2686$, and the tooth height ratio h in this case is h=0.7303 m. However, the gear tooth profile in this case is a combined-curve tooth profile of an involute and an arc, and the contact type of the arc curve section is not continuous contact but a momentary surface contact.

Patent Document 1: Japanese Patent Publication No. 3310239

However, the standard tooth height ratio (assuming that the total tooth height is 2 h) for an ordinary involute tooth profile is 1.0 m (for a full tooth height) and, therefore, when a tooth profile is used for a gear of a positive displacement flowmeter or of a gear pump, the one with a low tooth height ratio is disadvantageous due to its contact ratio and its discharge amount.

When a positive displacement flowmeter that incorporates therein a pair of helical gears employs an oval pitch curve as its reference rack tooth profile, the tooth height ratio of 0.7854 m that is the theoretical limit for one-point continuous contact tooth profiles may be set. However, no technical idea as above of employing the oval pitch curve as the reference rack tooth profile has been present for the conventional positive displacement flowmeters, and this technical idea has not been realized so far.

The present invention was conceived in view of the above circumstances, and the object thereof is to provide an ideal positive displacement flowmeter that includes a pair of helical gears employing an oval pitch curve as their reference rack tooth profile, is possible to set therein the tooth height ratio of π m/4 (0.7854 m) that is the theoretical limit for one-point continuous contact tooth profiles even for a few teeth, and accompanies no confinement phenomenon and a helical gear.

SUMMARY OF THE INVENTION

To solve the above problems, a first technical means is a positive displacement flowmeter that includes a pair of helical gears in a casing thereof and measures a flow using rotations of the helical gears, wherein the pair of helical gears employ an oval pitch curve having two or less leaves as its reference rack tooth profile and a moving radius of the oval pitch curve is expressed by $$\rho = a/(1 - b \cos n\theta)$$

(where, "ρ" is the moving radius that is the distance from the center of the rotation to the oval pitch curve, "a" is a similarity factor, "b" is the degree of flatness, "n" ($n \leq 2$) is the number of leaves, and "θ" is the argument).

A second technical means is the first technical means wherein, when the number of leaves n is n=2, the similarity factor "a", the degree of flatness "b", and the distance "$g_0$" are determined such that the tooth height ratio h is π m/4 (where "m" represents "tooth profile module") in $$\theta_0 + \alpha_0 - \tan^{-1}|{-(1 - b \cos n\theta_0)/nb \sin n\theta_0}| = 0$$

$$a = S_0(1 - b \cos n\theta_0)/\sin \theta_0$$

$$g_0 = a \cos \theta_0/(1 - b \cos n\theta_0)$$

$$h = a/(1-b) - g_0$$

where the cutter pressure angle at the pitch point is "$\alpha_0$", the argument at the pitch point is "$\theta_0$", the ¼ reference pitch is "$S_0$", the distance between the pole of the oval pitch curve and a pitch line is "$g_0$", and the tooth height ratio is "h".

A third technical means is the first technical means wherein, when the number of leaves n is 2 and the distance $g_0$ between the pole of the oval pitch curve and the pitch line is zero; in $$\theta_0 \alpha_0 - \tan^{-1}|-(1-b \cos n\theta_0)/nb \sin n\theta_0|=0$$

$$a=(1-b \cos n\theta_0)\sqrt{h_0^2+(S_0-h_0 \tan \alpha_0)^2}$$

$$h=a/(1-b) \qquad \text{[Eq. 1]}$$

where the cutter pressure angle at the pitch point is "$\alpha_0$", the argument at the pitch point is "$\theta_0$", the ¼ reference pitch is "$S_0$", the height of the straight line from the pitch line is "$h_0$", and the tooth height ratio is "h";
the similarity factor "a" and the degree of flatness "b" are determined such that the tooth height ratio h is π m/4 (where "m" represents "tooth profile module").

A fourth technical means is the first technical means wherein, when the number of leaves n is 1; in $$\theta_0+\alpha_0-\tan^{-1}|-(1-b \cos \theta_0)/b \sin \theta_0|=0$$

$$a=(1-b \cos \theta_0)\sqrt{g_0^2+S_0^2}$$

$$g_0=S_0/\tan \theta_0$$

$$h=a/(1-b)-g_0 \qquad \text{[Eq. 2]}$$

where the cutter pressure angle at the pitch point is "$\alpha_0$", the argument at the pitch point is "$\theta_0$", the ¼ reference pitch is "$S_0$", the distance between the pole of the oval pitch curve and the pitch line is "$g_0$", and the tooth height ratio is "h";
the similarity factor "a", the degree of flatness "b", and the distance $g_0$ are determined such that the tooth height ratio h is π m/4 (where "m" represents "tooth profile module").

A fifth technical means is the first technical means, wherein, when the number of leaves n is 1 and the distance $g_0$ between the pole of the oval pitch curve and the pitch line is zero; in $$\theta_0+\alpha_0-\tan^{-1}|-(1-b \cos \theta_0)/b \sin \theta_0|=0$$

$$a=(1-b \cos \theta_0)\sqrt{h_0^2+(S_0-h_0 \tan \alpha_0)^2}$$

$$h=a/(1-b) \qquad \text{[Eq. 3]}$$

where the cutter pressure angle at the pitch point is "$\alpha_0$", the argument at the pitch point is "$\theta_0$", the ¼ reference pitch is "$S_0$", the height of the straight line from the pitch line is "$h_0$", and the tooth height ratio is "h";
the similarity factor "a" and the degree of flatness "b" are determined such that the tooth height ratio h is π m/4 (where "m" represents "tooth profile module").

A sixth technical means is the third or fifth technical means, wherein, when the distance $g_0$ is zero, the pole of the oval pitch curve is on the pitch line and the height $h_0$ of the straight line from the pitch line is $0 \leq h_0 \leq Z/2 \sin^2 \alpha_0$ (where Z is the number of teeth of the helical gear).

A seventh technical means is any one of the second to the fifth technical means, wherein the cutter pressure angle $\alpha_0$ is 10° or larger.

An eighth technical means is any one of the first to the fifth technical means, wherein at least a portion of the tooth surface of each of the pair of helical gears is in mesh with each other of a protrusion and a recess.

A ninth technical means is helical gears configured as a pair, wherein the pair of helical gears employ an oval pitch curve having two or less leaves as a curve for their reference rack tooth profile and a moving radius of the oval pitch curve is expressed by $$\rho=a/(1-b \cos n\theta)$$

(where "ρ" is the moving radius that is the distance from the center of the rotation to the oval pitch curve, "a" is a similarity factor, "b" is the degree of flatness, "n" (n≦2) is the number of leaves, and "θ" is the argument).

According to the present invention, it is possible to set the tooth height ratio of π m/4 (0.7854 m) that is the theoretical limit for one-point continuous contact tooth profiles by incorporating a pair of helical gears that employ an oval pitch curve (elliptic curve) as their reference rack tooth profile.

It is also possible to realize a tooth profile that is resistant to abrasion because the tooth surfaces are in mesh of a protrusion and a recess, and therefore, the tooth surface strength of the gear tooth profile becomes high and the specific sliding between the tooth profiles is small.

The helical gears according to the invention are advantageous for designing tools or gear cutting processes because it is possible to obtain sufficient tooth profile strength for a few teeth and to set the cutter pressure angle at the pitch point. Especially, when the helical gears are used as gears of a positive displacement flowmeter, it is possible to provide ideal gears that accompany no confinement phenomenon by setting the tooth height ratio to be π m/4 that is the theoretical limit for one-point continuous contact tooth profiles.

Figure 1:
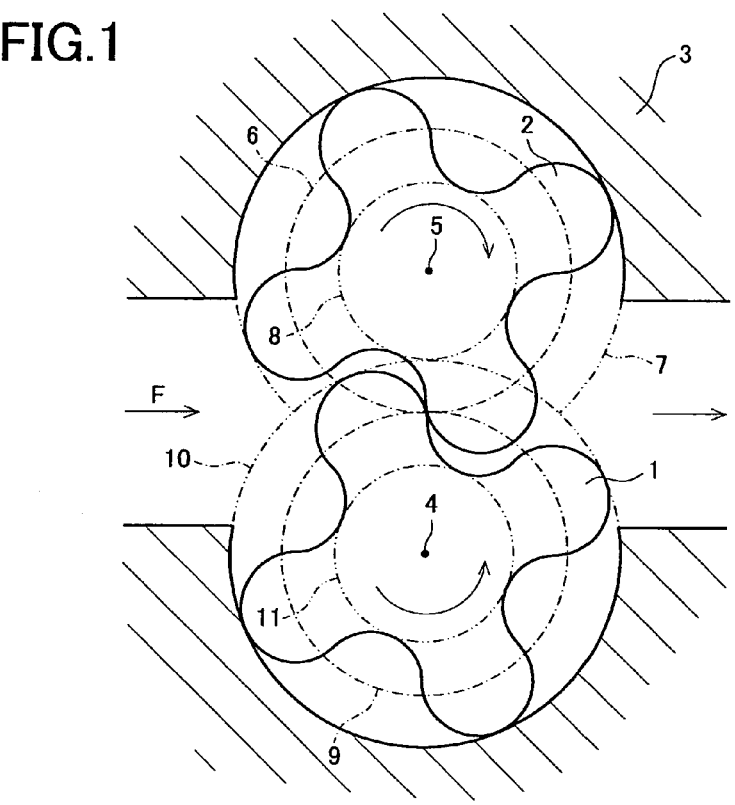
FIG. 1 is a diagram of an exemplary configuration of a positive displacement flowmeter according to an embodiment of the present invention.

EXPLANATIONS OF REFERENCE NUMERALS 1, 2 . . . helical gear, 3 . . . casing, 4, 5 . . . shaft center, 6, 9 . . . virtual pitch circle, 7, 10 . . . addendum circle, 8, 11 . . . deddendum circle

DESCRIPTION OF THE PREFERRED EMBODIMENTS

The main characteristic parts of a positive displacement flowmeter according to the present invention are as follows.
(1) It is possible to realize the tooth height ratio h=π m/4 (where "m" represents "tooth profile module").
(2) It has a cutter pressure angle at the pitch point that is advantageous for manufacturing tools or their lifetime, etc.
(3) It employs a one-point continuous contact tooth profile that accompanies no confinement phenomenon as flow meter gears.
(4) At least a portion of the tooth surface for meshing is in mesh of a protrusion and a recess to increase the contact pressure strength.

Preferred embodiments of a positive displacement flowmeter according to the present invention will be described with reference to the accompanying drawings.

FIG. 1 is a diagram of an exemplary configuration of a positive displacement flowmeter according to an embodiment of the present invention. In FIG. 1: "1" and "2" denote a pair of helical gears that are helically shaped (referred to as "helical gear"); "3" denotes a casing, "4" and "5" denote the shaft centers of the helical gears 1 and 2; "6" denotes a pitch circle of the helical gear 1; "7" denotes an addendum circle of the helical gear 1; "8" denotes a deddendum circle of the helical gear 1; "9" denotes a pitch circle of the helical gear 2; "10" denotes an addendum circle of the helical gear 2; and "11" denotes a deddendum circle of the helical gear 2. Helical gears that are different in the direction of torsion from each other, are formed in the same shape and the same size, and the number of teeth is four (Z=4) are exemplified as the pair of helical gears 1, 2. These helical gears 1, 2 are provided in the casing 3 of the flow meter main body, being rotatable in a direction indicated by arrows in FIG. 1 around the shaft centers 4, 5 while meshing with each other in a fluid F.

First Embodiment

The helical gears 1, 2 according to this embodiment are helical gears that employ an oval pitch curve having two or less leaves as a curve for their reference rack tooth profile. The moving radius of the oval pitch curve is expressed by Equation (1) below.

$$\rho = a/(1 - b \cos n\theta) \quad \text{Eq. (1)}$$

In Equation (1), "ρ" is the moving radius that is the distance from the center of the rotation to the oval pitch curve, "a" is a similarity factor, "b" is the degree of flatness, "n" is the number of leaves, and "θ" is the argument (the angle of the moving).

A locus of the reference rack tooth profile will hereinafter be represented by $(X_j, Y_j)$, and the case where a two-leaf oval pitch curve (n=2) is used as the curve for this reference rack tooth profile will be described as a representative example. Here, the pitch circle radius "R", the number of teeth of the gear "Z", a tooth profile module "m", and a ¼ reference pitch "$S_0$" are given below.

The pitch circle radius R=2
The number of teeth of the gear Z=4
The tooth profile module m=2R/Z=1
The ¼ reference pitch $S_0 = \pi m/4 = \pi R/2Z$ Polar coordinates (ρ, θ) of the two-leaf (n=2) oval pitch curve that is expressed by Equation (1) above are given as the reference rack tooth profile. It is assumed that the moving radius ρ starts at a major axis.

A tangential angle τ (that is assumed to be an acute angle) of the oval pitch curve may be obtained using the following equations.

$$\tau = \tan^{-1} |\rho/(d\rho/d\theta)| \quad \text{Eq. (2)}$$

$$d\rho/d\theta = -nab \sin n\theta/(1 - b \cos n\theta)^2 \quad \text{Eq. (3)}$$

From Equations (1) to (3) above, $$\tau = \tan^{-1} |-(1 - b \cos n\theta)/nb \sin n\theta| \quad \text{Eq. (4)}$$

By representing a cutter pressure angle at the pitch point $P_0$ as "$\alpha_0$", an amount of move of a polar of the oval pitch curve as "$g_0$", and the tooth height ratio as "h", the following conditional equations hold. The amount of movement of a polar $g_0$ refers to the distance between the polar of the oval pitch curve and a pitch line.

$$\theta_0 + \alpha_0 - \tan^{-1} |-(1 - b \cos n\theta_0)/nb \sin n\theta_0| = 0 \quad \text{Eq. (5)}$$

$$a = S_0(1 - b \cos n\theta_0)/\sin \theta_0 \quad \text{Eq. (6)}$$

$$g_0 = a \cos \theta_0/(1 - b \cos n\theta_0) \quad \text{Eq. (7)}$$

$$h = a/(1-b) - g_0 \quad \text{Eq. (8)}$$

where "$\theta_0$" is the argument at the pitch point $P_0$.

As the result of a simulation executed setting the cutter pressure angle $\alpha_0$ to be 14.5° and using the degree of flatness b as a parameter in Equation (5) above, the tooth height ratio h=π m/4=0.7854 m that is the theoretical limit value for single-pint continuous contact tooth profiles may be obtained from Equations (6) to (8) when the degree of flatness b is 0.2850 and the argument $\theta_0$ is 46.1033°. The similarity factor a is obtained from Equation (6) to be 1.1019 and the amount of move $g_0$ of the pole is obtained to be 0.7557 from Equation (7).

Figure 2:
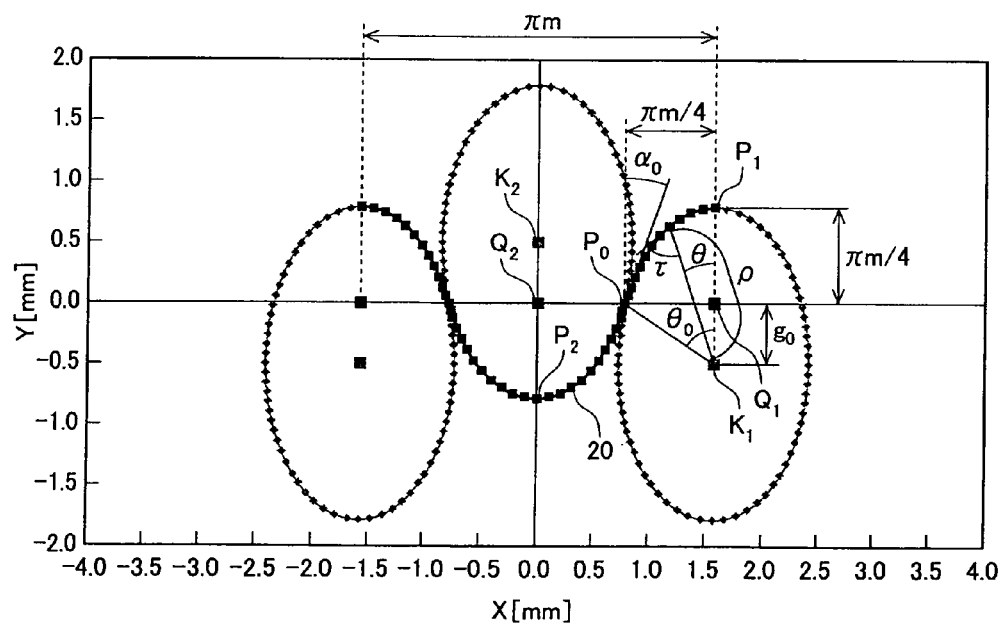
FIG. 2 is a diagram of an example of a reference rack tooth profile that is configured by an oval pitch curve for the number of leaves n is 2.

FIG. 2 shows an example of the reference rack tooth profile that is configured by the oval pitch curve obtained as above for n=2, $g_0 \neq 0$, and $h_0 = 0$. In FIG. 2, "20" denotes the reference rack tooth profile and this reference rack tooth profile 20 is configured for the tooth height ratio h=0.7854 m, the cutter pressure angle $\alpha_0$=14.5°, and the amount of movement of the pole (distance) $g_0$=0.7557.

In FIG. 2, a curve $P_1 P_0$ represents an addendum tooth profile of the reference rack and a curve $P_0 P_2$ represents a deddendum tooth profile of the reference rack, and these two curves $P_1 P_0$ and $P_0 P_2$ are symmetric with respect to the pitch point $P_0$. A straight line $Q_1 Q_2$ represents the pitch line. Points $K_1, K_2$ represent poles of the oval pitch curve and the points $K_1 r K_2$ are shifted from the pitch line $Q_1 Q_2$ by the distance $g_0$.

Figure 3:
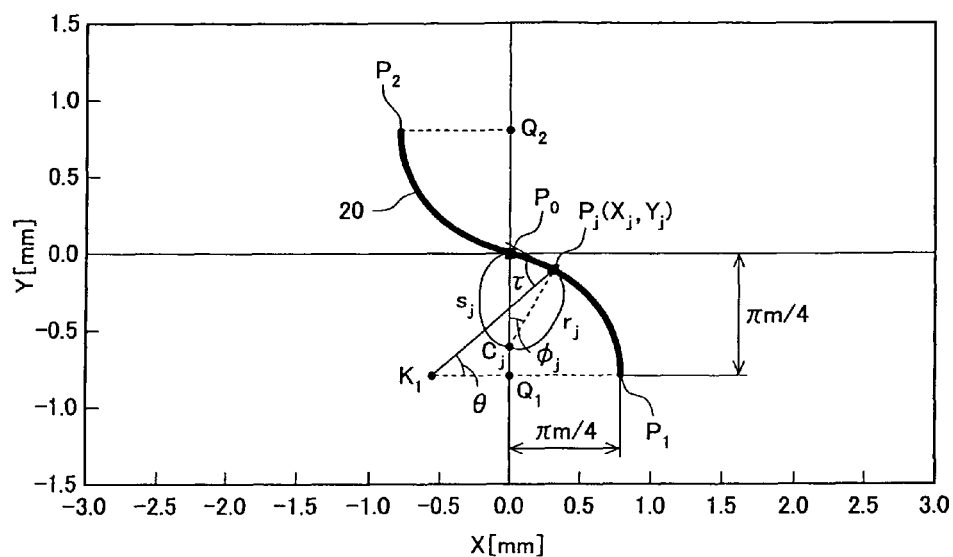
FIG. 3 is a diagram of an example of a reference rack tooth profile obtained by converting XY coordinates taking a pitch point $P_0$ as the origin.

FIG. 3 shows an example of the reference rack tooth profile obtained by converting XY coordinates taking the pitch point $P_0$ on the right side as the origin with the consideration that the side that includes the pole of the oval pitch curve located in the center is the substantial side of a tool.

In FIG. 3, when a point at which a line normal to a tangential line at a point $P_j$ on the reference rack tooth profile and the pitch line $Q_1Q_2$ cross each other is represented as "$C_j$", an angle "$\phi_j$" between the segment of the origin $P_0$-the point $C_j$ and the segment of the point $C_j$-the point $P_j$ is obtained as follows.

$$\phi_j = \tau - \theta \qquad \text{Eq. (9)}$$

A distance $r_j$ from the point $P_j$ to the point $C_j$ is obtained as follows.

$$r_j = (\rho \cos\theta - g_0)/\sin\phi_j \qquad \text{Eq. (10)}$$

A distance $S_j$ from the origin $P_j$ to the point $C_j$ is obtained as follows.

$$s_j = r_j \cos\phi_j + S_0 - \rho \sin\theta \qquad \text{Eq. (11)}$$

From these, the coordinates $(X_j, Y_j)$ of the reference rack tooth profile 20 may as follows

[Eq. 4]

$$X_j = \pm\rho \cos\theta \mp g_0 \qquad \text{Eq. (12)}$$

$$Y_j = \pm\rho \sin\theta \mp S_0 \qquad \text{Eq. (13)}$$

be obtained.

Figure 4:
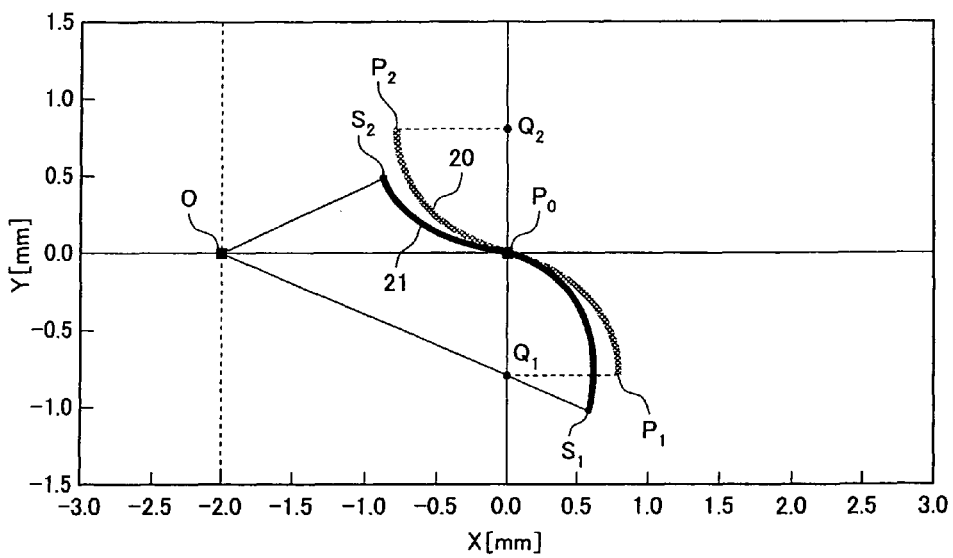
FIG. 4 is a diagram of an example of a reference rack tooth profile and a gear tooth profile that are used in a positive displacement flowmeter according to a first embodiment.

FIG. 4 is a diagram of an example of the reference rack tooth profile and the gear tooth profile that are used in the positive displacement flowmeter according to the first embodiment. In FIG. 4, "21" denotes a gear tooth profile. In the example, a substantially right-angle cross-sectional view is depicted of the reference rack tooth profile 20 that is the tool tooth profile and the gear tooth profile 21. An envelop of a group of curves that is formed when the reference rack tooth profile 20 is rolled along a pitch circle is the contour of the gear tooth profile 21. In an addendum coordinate system of the helical gear, a locus of the gear tooth profile is represented as "$(X_k, Y_k)$", the moving radius from the shaft center "O" of the helical gear to a point on the gear tooth profile 21 is represented as "$r_k$", and its rotational angle is represented as "$\theta_k$", and then, the moving radius $r_k$ and the rotational angle $\theta_k$ are obtained from the following equations. Here, "R" is the radius of the pitch circle of the helical gear.

From $r_k^2 = R^2 + r_j^2 - 2Rr_j \cos(\pi/2 + \phi_j)$,

[Eq. 5]

$$r_k = \sqrt{R^2 + r_j^2 \pm 2Rr_j \sin\phi_j} \qquad \text{Eq. (14)}$$

From $\theta_k = -\{S_j/R - \cos^{-1}((R^2 + r_k^2 - r_j^2)/2Rr_k)\}$,

[Eq. 6]

$$\theta_k = \mp\{S_j/R - \cos^{-1}((R^2 + r_k^2 - r_j^2)/2Rr_k)\} \qquad \text{Eq. (15)}$$

It is assumed that "$S_1P_0$" forms the addendum side of the gear tooth profile and "$P_0S_2$" forms the deddendum side of the gear tooth profile.

Therefore, the coordinates $(X_k, Y_k)$ of the contour of the gear tooth profile are expressed by the following equations.

$$X_k = r_k \cos\theta_k - R \qquad \text{Eq. (16)}$$

$$Y_k = r_k \sin\theta_k \qquad \text{Eq. (17)}$$

Figure 5:
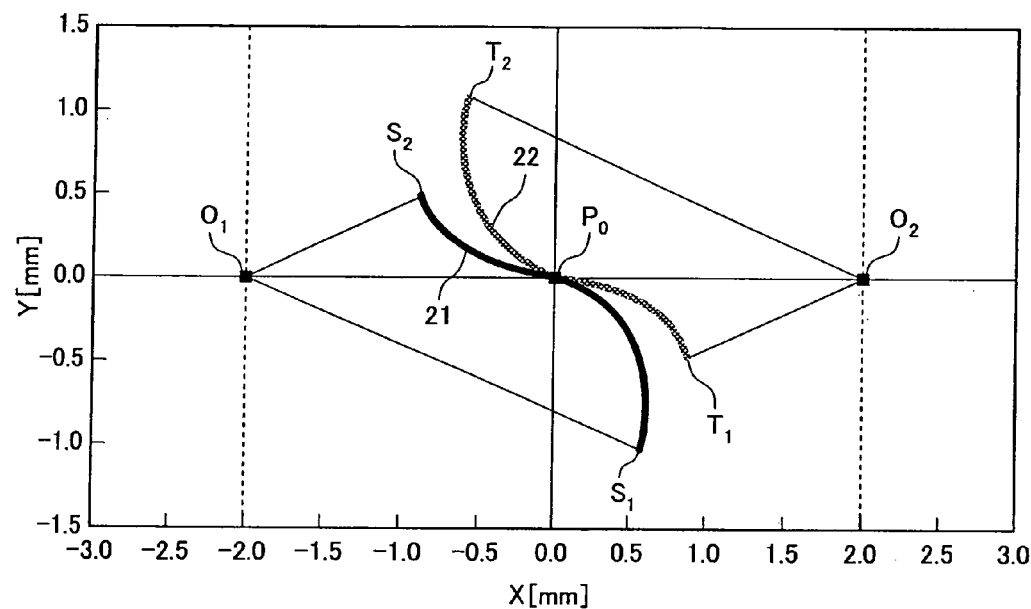
FIG. 5 is a diagram of an example of the meshing state of gear tooth profiles that are used in the positive displacement flowmeter according to the first embodiment.

FIG. 5 is a diagram of an example of a meshing state of gear tooth profiles that are used in the positive displacement flowmeter according to the first embodiment. The gear tooth profile 21 represents a tooth profile of the helical gear that has a shaft center $O_1$ and a gear tooth profile 22 represents a tooth profile of the helical gear that has a shaft center $O_2$. A pair of helical gear tooth profiles that employ the reference rack tooth profile 20 as their tool tooth profile are configured with the tooth height ratio h=0.7854 m and the cutter pressure angle $\alpha_0$=14.5°.

Figure 6:
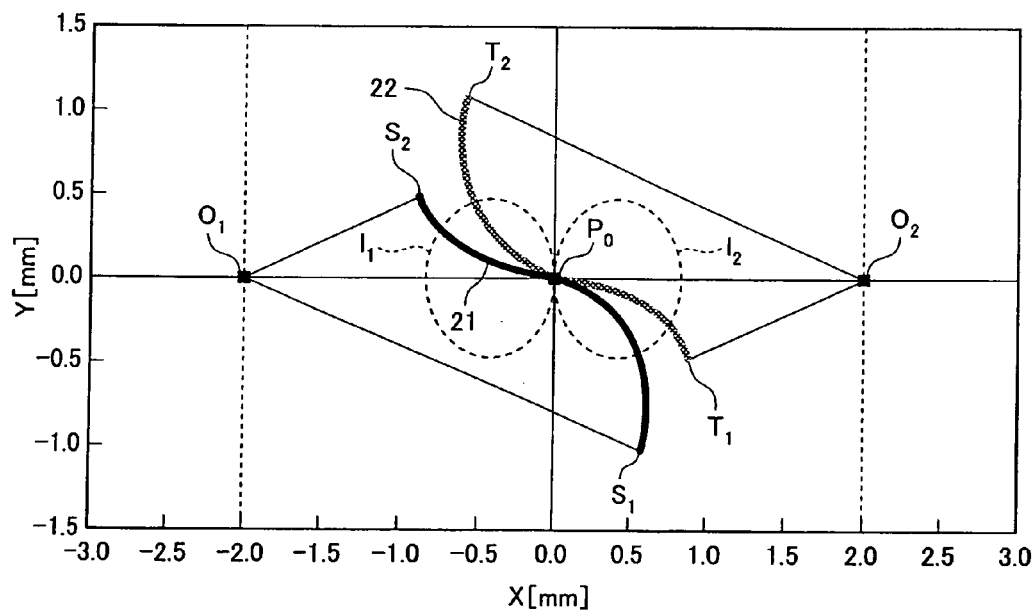
FIG. 6 is a diagram of an example of a locus of a contact point of a pair of gear tooth profiles that are used in the position displacement flowmeter according to the first embodiment.

FIG. 6 is a diagram of an example of a locus of a contact point of a pair of gear tooth profiles that are used in the positive displacement flowmeter according to the first embodiment. It is assumed that the example depicts a locus of a contact point of the pair of helical gears is drawn in polar coordinates (r, θ) whose origin is a pitch point. Let the pitch point $P_0$ be an origin and the shaft centers of the pair of helical gears be "$O_1$" and "$O_2$", and determine "$O_1P_0O_2$" be a base line. The contact point (r, θ) varies its position every minute and its locus is determined based on the relation between "r" and "θ".

$$r = r(\theta) \qquad \text{Eq. (18)}$$

In FIG. 6, loci $I_1$, $I_2$ of contact points of the pair of helical gear tooth profiles are depicted. The loci $I_1$, $I_2$ are obtained from the following equations.

$$X_i = r_j \sin\phi_j \qquad \text{Eq. (19)}$$

$$Y_i = r_j \cos\phi_j \qquad \text{Eq. (20)}$$

It is seen that the loci $I_1$, $I_2$ of the contact points are in complete lemniscate shapes and the pair of gear tooth profiles 21, 22 configure complete one-point continuous contact tooth profiles that constitutes a mesh in which convex is on the addendum side and concave is on the deddendum side.

Second Embodiment

A reference rack tooth profile of this embodiment has the amount of movement of the pole $g_0=0$, and therefore, it is different from the reference rack tooth profile of the first embodiment, the pole of the oval pitch curve is on the pitch line and is configured by providing a straight line section in the vicinity of the pitch point of the reference rack tooth profile.

Representing the locus of the reference rack tooth profile as $(X_j, Y_j)$, the case where a two-leaf oval pitch curve (n=2) is employed as the curve for the reference rack tooth profile will be described as a representative example. Similarly to the first embodiment, the pitch circle radius "R", the number of teeth of the gear "Z", a tooth profile module "m", and a ¼ reference pitch "$S_0$" are given below.

The pitch circle radius R=2
The number of teeth of the gear Z=4
The tooth profile module m=2R/Z=1
The ¼ reference pitch $S_0 = \pi m/4 = \pi R/2Z$ The polar coordinates $(\rho, \theta)$ of the two-leaf (n=2) oval pitch curve expressed by the Equation (1) above is given as the reference rack tooth profile. It is assumed that the moving radius ρ starts at a major axis.

The tangential angle τ (that is assumed to be an acute angle) of the oval pitch curve may be obtained from Equations (2) to (4) above.

Assuming that the tooth height ratio h is π m/4 that is the limit for one-point continuous contact tooth profiles and the cutter pressure angle at the pitch point $P_0$ is "$\alpha_0$", the range of the cutter pressure angle $\alpha_0$ is as follows.

$$\alpha_0 \geq 21.4°$$

Representing the height of the straight line from the pitch line as "$h_0$", the range of the height $h_0$ is as follows.

$$0 \leq h_0 \leq Z/2 \sin^2\alpha_0$$

Here, $h_0 = Z/2 \sin^2\alpha_0$ that is the maximum is used.

The similarity factor "a" may be obtained from the following equation.

[Eq. 7]

$$a = (1-b\cos n\theta_0)\sqrt{h_0^2 + (S_0 - h_0\tan\alpha_0)^2} \quad \text{Eq. (21)}$$

As a result of calculation executed using Equation (5) above assuming that the amount of movement of the pole of the oval pitch curve $g_0=0$ and using the cutter pressure angle $\alpha_0$ as a parameter, the tooth height ratio $h=\pi m/4=0.7854$ m that is the limit value for one-point continuous contact tooth profiles can be obtained using Equation (8) above, that is, $h=a/(1-b)$ when the cutter pressure angle $\alpha_0$ is 26.3000°, the degree of flatness is 0.0712, and the similarity factor a is 0.7294. The argument $\theta_0$ at the pitch point may be obtained from the following equation.

$$\theta_0 = \tan^{-1}((S_0 - h_0\tan\alpha_0)/h_0) \quad \text{Eq. (22)}$$

Figure 7:
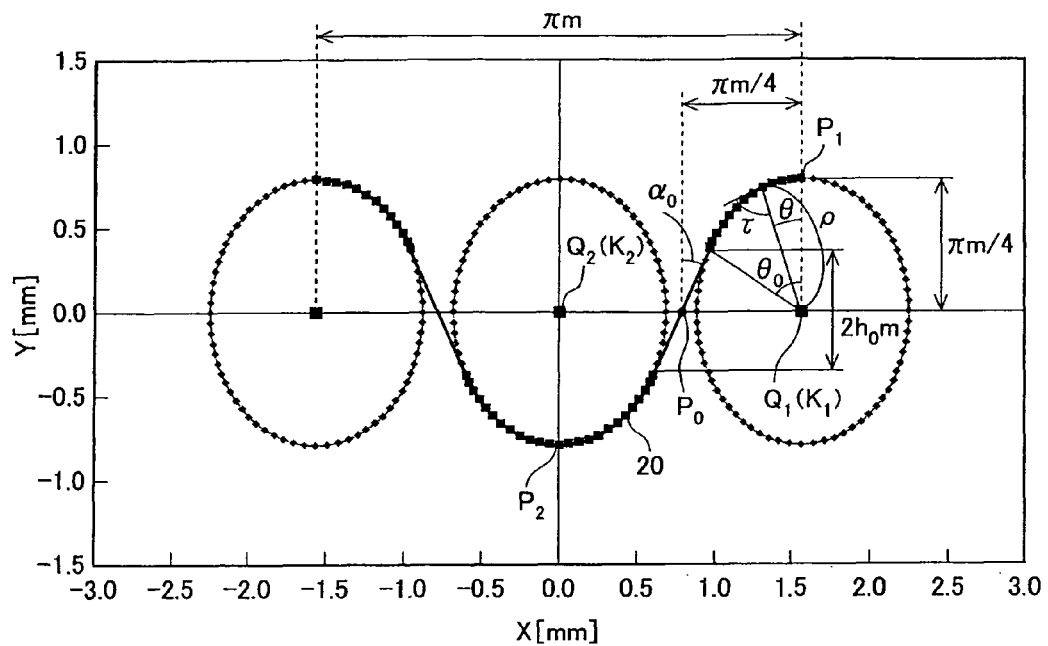
FIG. 7 is a diagram of another example of the reference rack tooth profile that is configured by an oval pitch curve for the number of leaves n is 2.

FIG. 7 shows an example of the reference rack tooth profile that is configured by the oval pitch curve obtained as above for $n=2$, $g_0=0$, and $h_0\neq 0$. The reference rack tooth profile 20 is configured for the tooth height ratio $h=0.7854$ m, the cutter pressure angle $\alpha_0=26.3000°$, and the amount of movement of the pole $g_0=0$.

In FIG. 7, the curve $P_1P_0$ represents an addendum tooth profile of the reference rack and the curve $P_0P_2$ represents a deddendum tooth profile of the reference rack, and these two curves $P_1P_0$ and $P_0P_2$ are symmetric with respect to the pitch point $P_0$. The straight line $Q_1Q_2$ represents the pitch line. The points $K_1$, $K_2$ represent poles of the oval pitch curve and the points $K_1$, $K_2$ are arranged on the pitch line $Q_1Q_2$.

Figure 8:
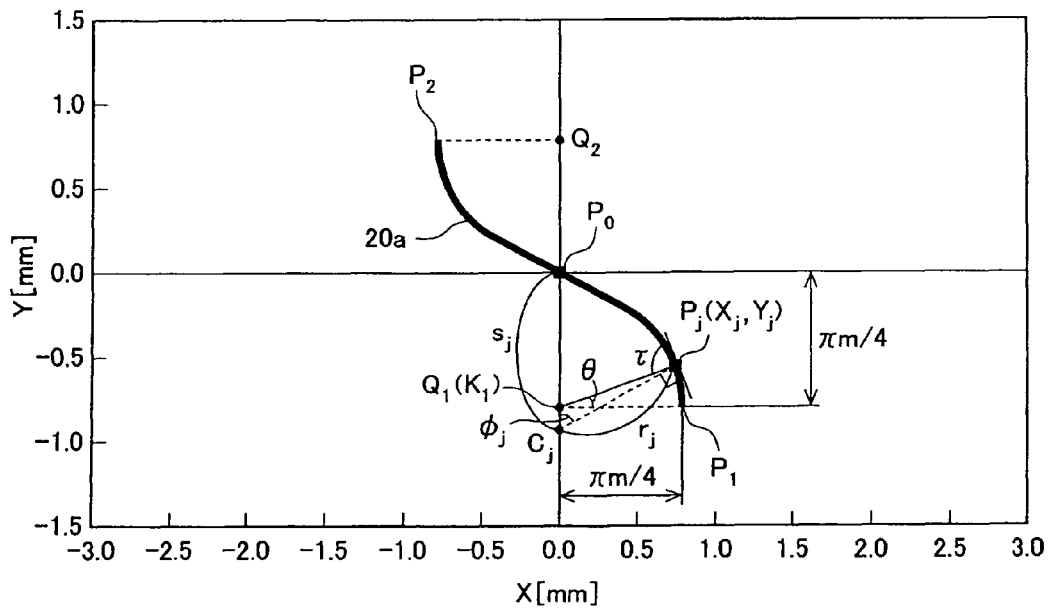
FIG. 8 is a diagram of another example of the reference rack tooth profile obtained by converting the XY coordinates taking the pitch point $P_0$ as the origin.

FIG. 8 shows an example of the reference rack tooth profile obtained by converting XY coordinates taking the pitch point $P_0$ on the right side as the origin with the consideration that the side that includes the pole of the oval pitch curve located in the center is the substantial side of a tool.

In FIG. 8, when a point at which a line normal to a tangential line at a point $P_j$ on the reference rack tooth profile and the pitch line $Q_1Q_2$ cross each other is represented as "$C_j$", an angle "$\phi_j$" between the segment of the origin $P_0$-the point $C_j$ and the segment of the point $C_j$-the point $P_j$ may be obtained using Equation (9) above.

A distance $r_j$ from the point $P_j$ to the point $C_j$ is obtained as follows.

$$r_j = \rho\cos\theta/\sin\phi_j \quad \text{Eq. (23)}$$

A distance $S_j$ from the origin $P_0$ to the point $C_j$ can be obtained using Equation (11) above.

From these, the coordinates $(X_j, Y_j)$ of the reference rack tooth profile 20 except a straight line section 20a may as follows

[Eq. 8]

$$X_j = \pm\rho\cos\theta \quad \text{Eq. (24)}$$

$$Y_j = \pm\rho\sin\theta \mp S_0 \quad \text{Eq. (24)}$$

be obtained.

As to the straight line section 20a to be inserted into the vicinity of the pitch point $P_0$, the straight line section 20a is divided using the height $h_0$ of the straight line as a parameter as follows.

$$Z/2\sin^2\alpha_0 \geq h_0 \geq 0 \quad \text{Eq. (26)}$$

$$\phi_j = \alpha_0 = \text{const.} \quad \text{Eq. (27)}$$

$$r_j = h_0/\sin\alpha_0 \quad \text{Eq. (28)}$$

$$s_j = r_j/\cos\alpha_0 \quad \text{Eq. (29)}$$

Figure 9:
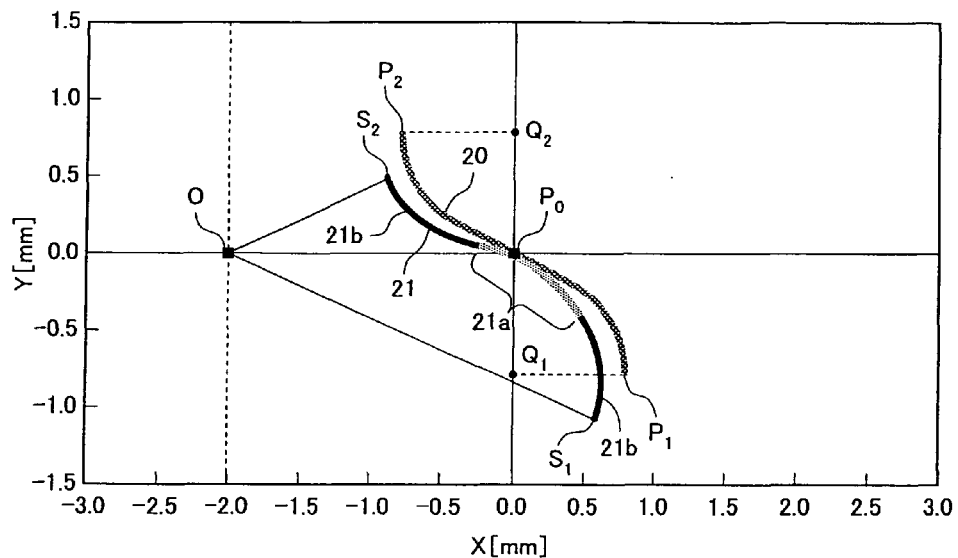
FIG. 9 is a diagram of another example of the reference rack tooth profile and the gear tooth profile that are used in a positive displacement flowmeter according to a second embodiment.

FIG. 9 shows another example of the reference rack tooth profile and the gear tooth profile that are used in the positive displacement flowmeter according to the second embodiment. This example shows a substantially-right-angle cross-sectional view of the reference rack tooth profile 20 that is the tool tooth profile and the gear tooth profile 21. A locus of the gear tooth profile is represented as "$(X_k, Y_k)$" in an addendum coordinate system of the helical gear; and the moving radius from the shaft center "O" of the helical gear to a point on the gear tooth profile 21 is represented as "$r_k$"; and its rotational angle is represented as "$\theta_k$". The moving radius $r_k$ and the rotational angle $\theta_k$ are obtained using Equations (14), (15) above. Here, "R" is the radius of the pitch circle of the helical gear.

Therefore, the coordinates $(X_k, Y_k)$ of the contour of the gear tooth profile are expressed by Equations (16), (17) above, that is, $X_k = r_k\cos\theta_k - R$, $Y_k = r_k\sin\theta_k$. However, it is assumed that "$S_1P_0$" forms the addendum side of the gear tooth profile and "$P_0S_2$" forms the deddendum side of the gear tooth profile.

In FIG. 9, an involute curve 21a created using straight lines and a curve 21b created using an oval pitch curve of the gear tooth profile 21 are depicted, and the vicinity of the pitch point $P_0$ is configured using the involute curve 21a.

Figure 10:
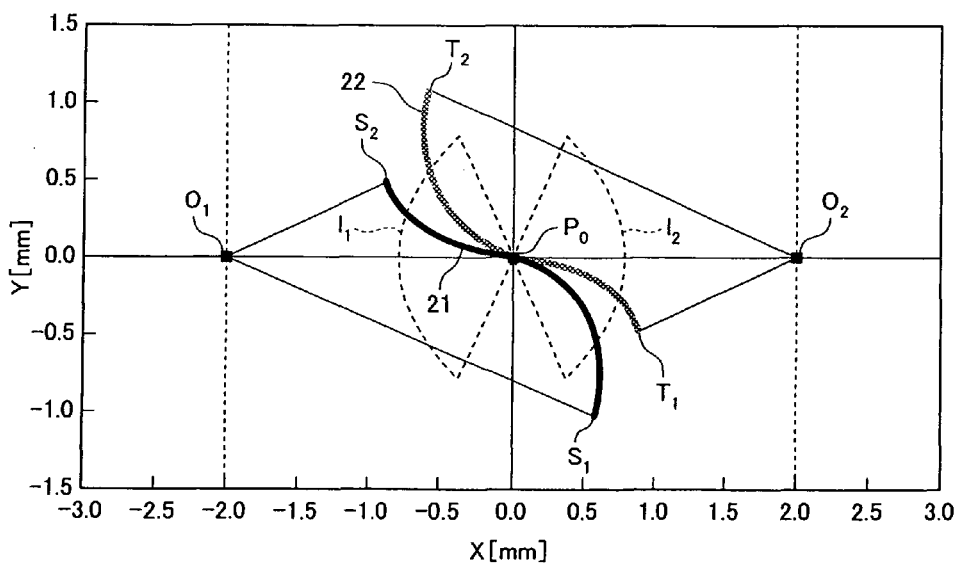
FIG. 10 is a diagram of another example of the locus of the contact point of the pair of gear tooth profiles that are used in the positive displacement flowmeter according to the second embodiment.

FIG. 10 is a diagram of another example of the locus of the contact point of the pair of gear tooth profiles that are used in the positive displacement flowmeter according to the second embodiment. It is assumed that FIG. 10 depicts a locus of a contact point of the pair of helical gears using polar coordinates $(r, \theta)$ whose origin is the pitch point. The pitch point $P_0$ is determined to be the origin, the shaft centers of the pair of helical gears are represented as "$O_1$" and "$O_2$", and "$O_1P_0O_2$" is determined to be the base line. The contact point $(r, \theta)$ varies its position every moment and the locus of its position is determined based on the relation between "r" and "θ".

In FIG. 10, loci $I_1$, $I_2$ of contact points of the pair of helical gear tooth profiles are depicted. The loci $I_1$, $I_2$ are obtained using Equations (19), (20) above.

As above, according to the above embodiments, it is possible to set the tooth height ratio of $\pi m/4$ (0.7854 m) that is the theoretical limit for one-point continuous contact tooth profiles by incorporating a pair of helical gears that employ an oval pitch curve (elliptic curve) as their reference rack tooth profile.

It is also possible to realize a tooth profile that is resistant to abrasion because the tooth surfaces are in mesh of a protrusion and a recess, and therefore, the tooth surface strength of the gear tooth profile becomes high and the specific sliding between the tooth profiles is small.

The helical gears according to the invention are advantageous for designing tools or gear cutting processes because it is possible to obtain sufficient tooth profile strength for a few teeth and to set the cutter pressure angle at the pitch point. Especially, when the helical gears are used as gears of a positive displacement flowmeter, it is possible to provide ideal gears that accompany no confinement phenomenon by setting the tooth height ratio to be $\pi m/4$ that is the theoretical limit for one-point continuous contact tooth profiles.

Figure 11:
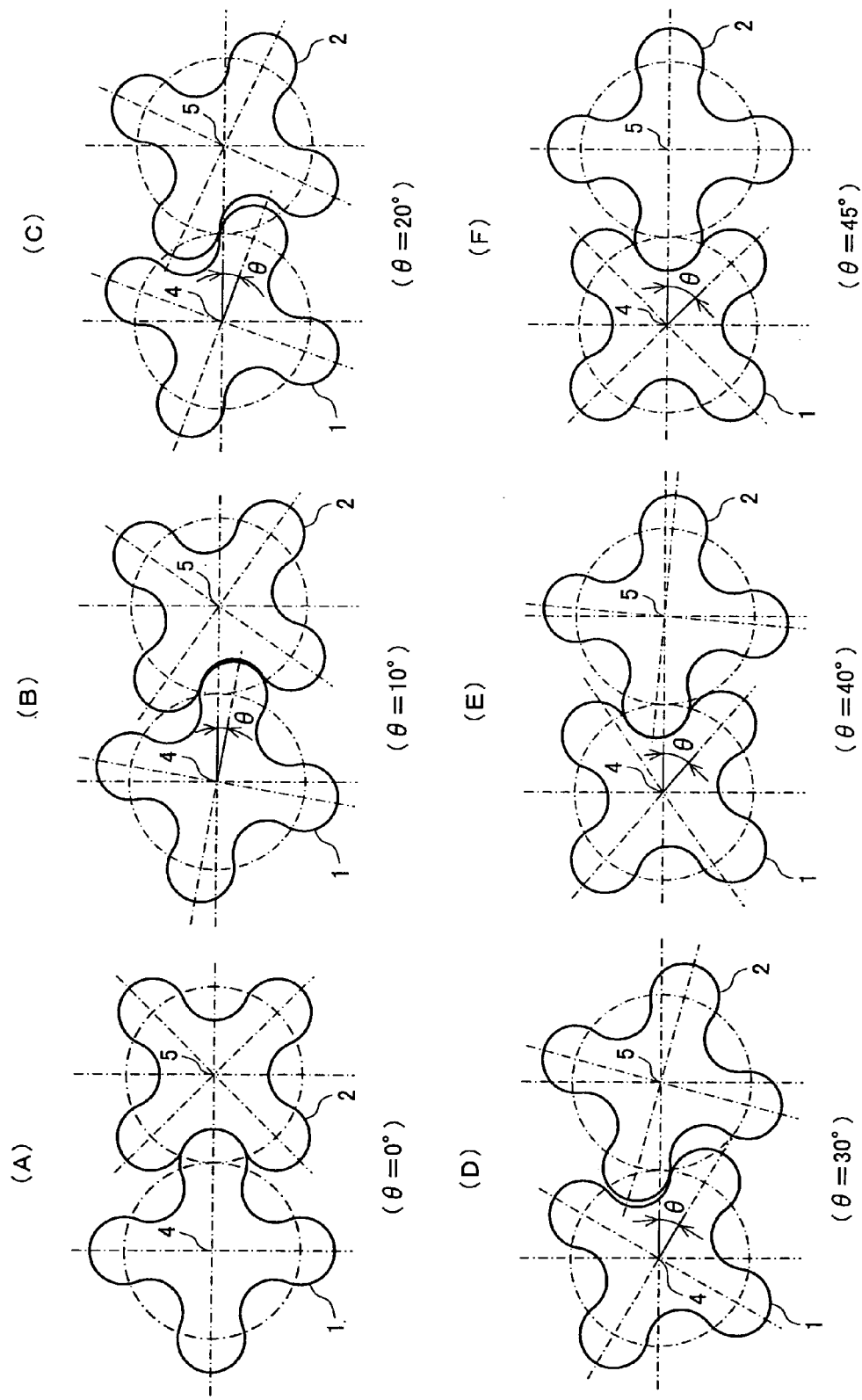
FIG. 11 is a diagram of exemplary transition of the meshing state of a pair of helical gears for the number of gear teeth Z is 4.

FIG. 11 is a diagram of exemplary transition of a meshing state of a pair of helical gears 1, 2 for the number of gear teeth that is Z=4. The transition of the meshing state of the helical gears 1, 2 is depicted when they rotate from 0° to 45° in FIG. 11(A) through FIG. 11(F) in order. The helical gears 1, 2 are arranged rotatably, around the shaft centers 4, 5 in the casing 3. However the description of the casing 3 is omitted.

FIG. 11(A) depicts the case where the angle θ of the helical gear 1 is 0°, FIG. 11(B) depicts the case where the angle θ of the helical gear 1 is 10°, and FIG. 11(C) depicts the case where the angle θ of the helical gear 1 is 20°.

Further, FIG. 11(D) depicts the case where the angle θ of the helical gear 1 is 30°, FIG. 11(E) depicts the case where the angle θ of the helical gear 1 is 40°, and FIG. 11(F) depicts the case where the angle θ of the helical gear 1 is 45°.

In the above, description has been made exemplifying the case where a two-leaf (n=2) oval pitch curve is employed as the reference rack tooth profile. However, a one-leaf (n=1) oval pitch curve (that is, an elliptic curve) may also be applied to the reference rack tooth profile.

When analysis is also executed for the case of the one-leaf oval pitch curve, the tooth height ratio that is h=π m/4 (where the cutter pressure angle is set to be $\alpha_0=14.5°$ may be realized based on the following conditional equations in the first embodiment where the pole of the oval pitch curve is shifted from the pitch line ($g_0 \neq 0$, $h_0=0$).

[Eq. 9]

$$\theta_0+\alpha_0-\tan^{-1}|-(1-\cos\theta_0)/b\sin\theta_0|=0$$

$$h=a/(1-b)-g_0$$

$$a=(1-b\cos\theta_0)\sqrt{g_0^2+S_0^2} \quad \text{Eq. (30)}$$

$$g_0=S_0/\tan\theta_0 \quad \text{Eq. (31)}$$

Figure 12:
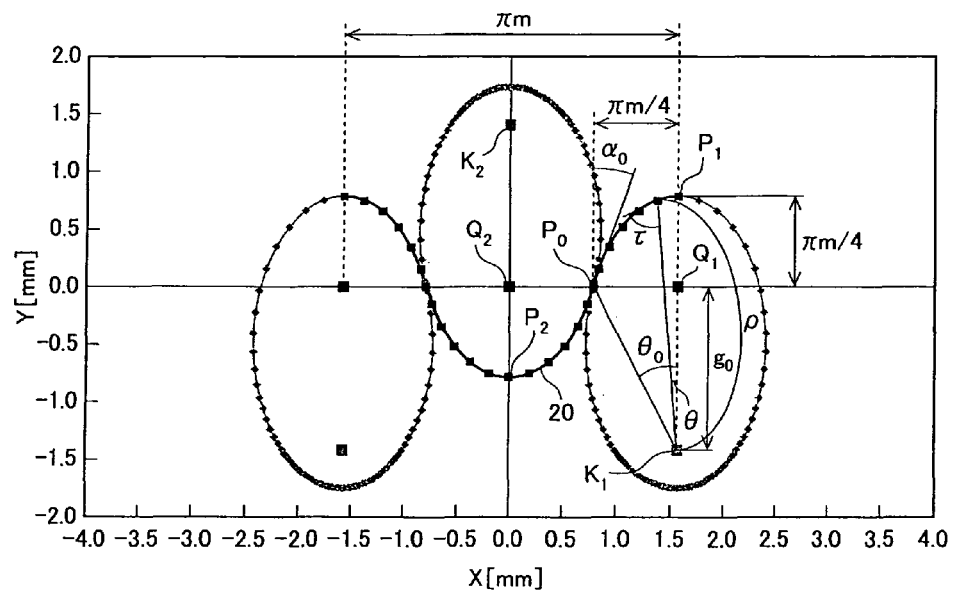
FIG. 12 is a diagram of an example of a reference rack tooth profile that is configured by an oval pitch curve for the number of leaves n is 1.

An example of the reference rack tooth profile is depicted in FIG. 12 that is configured by an oval pitch curve obtained as above with n=1, $g_0 \neq 0$, and $h_0=0$. The reference rack tooth profile 20 is configured with the tooth height ratio h=0.7854 m, the cutter pressure angle $\alpha_0=14.5°$, and the amount of movement of the pole $g_0=1.4223$.

In FIG. 12, the curve $P_1P_0$ represents an addendum tooth profile of the reference rack and the curve $P_0P_2$ represents a deddendum tooth profile of the reference rack, and these two curves $P_1P_0$ and $P_0P_2$ are symmetric with respect to the pitch point $P_0$. The straight line $Q_1Q_2$ represents the pitch line. The points $K_1$, $K_2$ represent poles of the oval pitch curve and the points $K_1$, $K_2$ are shifted from the pitch line $Q_1Q_2$ by the distance $g_0$.

The parameters in this case may be obtained as follows: the similarity factor a is 0.5690, the degree of flatness b is 0.7422, and the argument $\theta_0$ is 28.9068°.

In the second embodiment where the pole of the oval pitch curve is placed on the pitch line ($g_0=0$, $h_0 \neq 0$), the tooth height ratio h=π m/4 may be realized (where the cutter pressure angle $\alpha_0$ is assumed to be 29.1°) based on the following conditional equations.

[Eq. 10]

$$\theta_0+\alpha_0-\tan^{-1}|-(1-b\cos\theta_0)/b\sin\theta_0|=0$$

$$h=a/(1-b)$$

$$a=(1-b\cos n\theta_0)\sqrt{h_0^2+(S_0-h_0\tan\alpha_0)^2} \quad \text{Eq. (32)}$$

However, $0 \leq h_0 \leq Z/2 \sin^2\alpha_0$ (where Z is the number of teeth of the helical gear).

Figure 13:
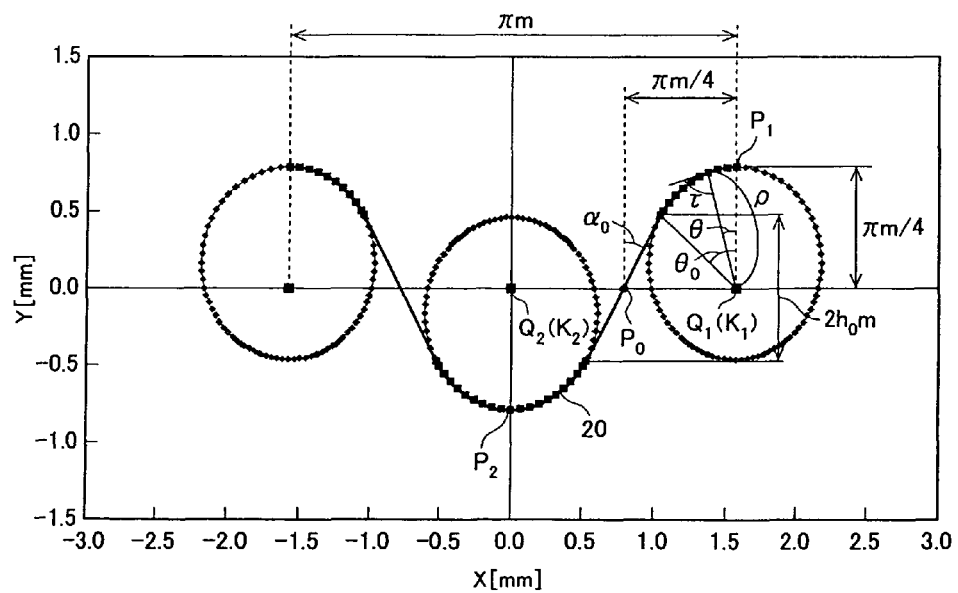
FIG. 13 is a diagram of another example of the reference rack tooth profile that is configured by an oval pitch curve for the number of leaves n is 1.

An example of the reference rack tooth profile is depicted in FIG. 13 that is configured by an oval pitch curve obtained as above with n=1, $g_0=0$, and $h_0 \neq 0$. The reference rack tooth profile 20 is configured by the tooth height ratio h=0.7854 m, the cutter pressure angle $\alpha_0=29.1°$, and the amount of movement of the pole $g_0=0$.

In FIG. 13, the curve $P_1P_0$ represents an addendum tooth profile of the reference rack and the curve $P_0P_2$ represents a deddendum tooth profile of the reference rack, and these two curves $P_1P^0$ and $P_0P_2$ are symmetric with respect to the pitch point $P_0$. The straight line $Q_1Q_2$ represents the pitch line. The points $K_1$, $K_2$ represent poles of the oval pitch curve and the points $K_1$, $K_2$ are provided on the pitch line $Q_1Q_2$.

The parameters in this case may be obtained as follows: the similarity factor a is 0.5820; the degree of flatness b is 0.2590; and the argument $\theta_0$ is 47.8224°.

In the above, the cases where the helical gears according to the present invention are applied to a positive displacement flowmeter have been described as the representative examples. However, needless to say, these helical gears may be applied to a cog-wheel pump, etc.

The invention claimed is:

1. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b\cos n\theta)$ (where "ρ" is the moving radius that is a distance from the center of rotation to the oval pitch curve, "a" is a similarity factor, "b" is a degree of flatness, "n" ($n \leq 2$) is number of leaves, and "θ" is an argument);
wherein when the number of leaves n is n=2, the similarity factor "a", the degree of flatness "b", and a distance "$g_0$" are determined such that a tooth height ratio h is π m/4 (where "m" represents "tooth profile module") in $$\theta_0+\alpha_0-\tan^{-1}|-(1-b\cos n\theta_0)/nb\sin n\theta_0|=0$$

$$a=S_0(1-b\cos n\theta_0)/\sin\theta_0$$

$$g_0=a\cos\theta_0/(1-b\cos n\theta_0)$$

$$h=a/(1-b)-g_0$$

where a cutter pressure angle at a pitch point is "$\alpha_0$", an argument at the pitch point is "$\theta_0$", a ¼ reference pitch is "$S_0$", a distance between a pole of the oval pitch curve and a pitch line is "$g_0$", and the tooth height ratio is "h".

2. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b\cos n\theta)$ (where "ρ" is the moving radius that is a distance from the center of rotation to the oval pitch curve, "a" is a similarity factor, "b" is a degree of flatness, "n" ($n \leq 2$) is number of leaves, and "θ" is an argument);
wherein when the number of leaves n is 2 and a distance $g_0$ between a pole of the oval pitch curve and a pitch line is zero, the similarity factor "a" and the degree of flatness "b" are determined such that the tooth height ratio h is π m/4 (where "m" represents "tooth profile module"); in
[Eq. 1]

$$\theta_0+\alpha_0-\tan^{-1}|-(1-b\cos n\theta_0)/nb\sin n\theta_0|=0$$

$$a=(1-b\cos n\theta_0)(h_0^2+(S_0-h_0\tan\alpha_0)^2)^{0.5}$$

$$h=a/(1-b)$$

where a cutter pressure angle at a pitch point is "$\alpha_0$", an argument at the pitch point is "$\theta_0$", a ¼ reference pitch is "$S_0$", a height of a straight line from the pitch line is "$h_0$", and the tooth height ratio is "h".

3. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b \cos n\theta)$ (where "$\rho$" is the moving radius that is a distance from the center of rotation to the oval pitch curve, "a" is a similarity factor, "b" is a degree of flatness, "n" ($n \leq 2$) is number of leaves, and "$\theta$" is an argument);
wherein when a number of leaves n is 1, the similarity factor "a", the degree of flatness "b", and a distance $g_0$ are determined such that a tooth height ratio h is $\pi$ m/4 (where "m" represents "tooth profile module"); in [Eq. 2]

$$\theta_0 + \alpha_0 - \tan^{-1}|-(1-b \cos \theta_0)/b \sin \theta_0| = 0$$

$$a = (1-b \cos \theta_0)(g_0^2 + S_0^2)^{0.5}$$

$$g_0 = S_0/\tan \theta_0$$

$$h = a/(1-b) - g_0$$

where a cutter pressure angle at a pitch point is "$\alpha_0$", an argument at the pitch point is "$\theta_0$", a ¼ reference pitch is "$S_0$", a distance between a pole of the oval pitch curve and a pitch line is "$g_0$", and the tooth height ratio is "h".

4. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b \cos n\theta)$ (where "$\rho$" is the moving radius that is a distance from the center of rotation to the oval pitch curve, "a" is a similarity factor, "b" is a degree of flatness, "n" ($n \leq 2$) is number of leaves, and "$\theta$" is an argument);
wherein when the number of leaves n is 1 and a distance $g_0$ between a pole of the oval pitch curve and ua pitch line is zero, the similarity factor "a" and the degree of flatness "b" are determined such that a tooth height ratio h is $\pi$ m/4 (where "m" represents "tooth profile module"); in [Eq. 3]

$$\theta_0 + \alpha_0 - \tan^{-1}|-(1-b \cos \theta_0)/b \sin \theta_0| = 0$$

$$a = (1-b \cos \theta_0)(h_0^2 + (S_0 - h_0 \tan \alpha_0)^2)^{0.5}$$

$$h = a/(1-b)$$

where a cutter pressure angle at a pitch point is "$\alpha_0$", an argument at the pitch point is "$\theta_0$", a ¼ reference pitch is "$S_0$", a height of a straight line from the pitch line is "$h_0$", and the tooth height ratio is "h".

5. The positive displacement flowmeter as defined in any one of claims 1 to 4, wherein
at least a portion of a tooth surface of each of the pair of helical gears is in mesh with each other of a protrusion and a recess.

6. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b \cos n\theta)$ (where "$\rho$" is the moving radius that is a distance from the center of rotation to the oval pitch curve, "a" is a similarity factor, "b" is a degree of flatness, "n" ($n \leq 2$) is number of leaves, and "$\theta$" is an argument);
wherein when the number of leaves n is 2 and a distance $g_0$ between a pole of the oval pitch curve and a pitch line is zero, the similarity factor "a" and the degree of flatness "b" are determined such that the tooth height ratio h is $\pi$ m/4 (where "m" represents "tooth profile module"); in [Eq. 1]

$$\theta_0 + \alpha_0 - \tan^{-1}|-(1-b \cos n_0)/nb \sin n\theta_0| = 0$$

$$a = (1-b \cos n\theta_0)(h_0^2 + (S_0 - h_0 \tan \alpha_0)^2)^{0.5}$$

$$h = a/(1-b)$$

where a cutter pressure angle at a pitch point is "$\alpha_0$", an argument at the pitch point is "$\theta_0$", a ¼ reference pitch is "$S_0$", a height of a straight line from the pitch line is "$h_0$", and the tooth height ratio is "h"; and
wherein when the distance $g_0$ is $g_0=0$, the pole of the oval pitch curve is on the pitch line, and wherein when the distance $g_0$ is $g_0=0$, the height $h_0$ of the straight line from the pitch line is $0 \leq h_0 \leq Z/2 \sin^2 \alpha_0$ (where Z is a number of teeth of the helical gear).

7. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b \cos n\theta)$ (where "$\rho$" is the moving radius that is a distance from the center of rotation to the oval pitch curve, "a" is a similarity factor, "b" is a degree of flatness, "n" ($n \leq 2$) is number of leaves, and "$\theta$" is an argument);
wherein when the number of leaves n is n=2, the similarity factor "a", the degree of flatness "b", and a distance "$g_0$" are determined such that a tooth height ratio h is it $\pi$ m/4 (where "m" represents "tooth profile module") in $$\theta_0 + \alpha_0 - \tan^{-1}|-(1-b \cos n\theta_0)/nb \sin n_0| = 0$$

$$a = S_0(1-b \cos n\theta_0)/\sin \theta_0$$

$$g_0 = a \cos \theta_0/(1-b \cos n\theta_0)$$

$$h = a/(1-b) - g_0$$

where a cutter pressure angle at a pitch point is "$\alpha_0$", an argument at the pitch point is "$\theta_0$" a ¼ reference pitch is "$S_0$" a distance between a pole of the oval pitch curve and a pitch line is "$g_0$", and the tooth height ratio is "h"; and
wherein the cutter pressure angle $\alpha_0$ is 10° or larger.

8. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b\cos n\theta)$ (where "$\rho$" is the moving radius that is a distance from a center of rotation to the oval pitch curve, "a" is a similarity factor, "b" is a degree of flatness, "n" ($n \leqq 2$) is number of leaves, and "$\theta$" is an argument);
wherein when number of leaves n is 1 and a distance $g_0$ between a pole of the oval pitch curve and a pitch line is zero, the similarity factor "a" and the degree of flatness "b" are determined such that a tooth height ratio h is $\pi m/4$ (where "m" represents "tooth profile module"); in [Eq. 3]

$$\theta_0 + \alpha_0 - \tan^{-1}|-(1-b\cos\theta_0)/b\sin\theta_0|=0$$

$$a=(1-b\cos\theta_0)(h_0^2+(S_0-h_0\tan\alpha_0)^2)^{0.5}$$

$$h=a/(1-b)$$

where a cutter pressure angle at a pitch point is "$\alpha_0$", an argument at the pitch point is "$\theta_0$", a ¼ reference pitch is "$S_0$", a height of a straight line from the pitch line is "$h_0$", and the tooth height ratio is "h"; and
wherein when the distance $g_0$ is $g_0=0$, the pole of the oval pitch curve is on the pitch line, and wherein when the distance $g_0$ is $g_0=0$, the height $h_0$ of the straight line from the pitch line is $0 \leqq h \leqq 0 \leqq Z/2 \sin^2 \alpha_0$ (where Z is a number of teeth of the helical gear).

9. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b\cos n\theta)$ (where "$\rho$" is the moving radius that is a distance from the center of rotation to the oval pitch curve, "a" is a similarity factor, "b" is a degree of flatness, "n" ($n \leqq 2$) is number of leaves, and "$\theta$" is an argument);
wherein when the number of leaves n is 2 and a distance $g_0$ between a pole of the oval pitch curve and a pitch line is zero, the similarity factor "a" and the degree of flatness "b" are determined such that the tooth height ratio h is $\pi m/4$ (where "m" represents "tooth profile module"); in [Eq. 1]

$$\theta_0 + \alpha_0 - \tan^{-1}|-(1-b\cos n\theta_0)/nb\sin n\theta_0|=0$$

$$a=(1-b\cos n\theta_0)(h_0^2+(S_0-h_0\tan\alpha_0)^2)^{0.5}$$

$$h=a/(1-b)$$

where a cutter pressure angle at a pitch point is "$\alpha_0$", an argument at the pitch point is "$\theta_0$", a ¼ reference pitch is "$S_0$", a height of a straight line from the pitch line is "$h_0$", and the tooth height ratio is "h"; and
wherein the cutter pressure angle $\alpha_0$ is 10° or larger.

10. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b\cos n\theta)$ (where "$\rho$" is the moving radius that is a distance from the center of rotation to the oval pitch curve, "a" is a similarity factor, "b" is a degree of flatness, "n" ($n \leqq 2$) is number of leaves, and "$\theta$" is an argument);
wherein when a number of leaves n is 1, the similarity factor "a", the degree of flatness "b", and a distance $g_0$ are determined such that a tooth height ratio h is $\pi m/4$ (where "m" represents "tooth profile module"); in [Eq. 2]

$$\theta_0 + \alpha_0 - \tan^{-1}|-(1-b\cos\theta_0)/b\sin\theta_0|=0$$

$$a=(1-b\cos\theta_0)(g_0^2+S_0^2)^{0.5}$$

$$g_0=S_0/\tan\theta_0$$

$$h=a/(1-b)-g_0$$

where a cutter pressure angle at a pitch point is "$\alpha_0$", an argument at the pitch point is "$\theta_0$", a ¼ reference pitch is "$S_0$", a distance between a pole of the oval pitch curve and a pitch line is "$g_0$", and the tooth height ratio is "h"; and
wherein the cutter pressure angle $\alpha_0$ is 10° or larger.

11. A positive displacement flowmeter, comprising:
a pair of helical gears in a casing thereof;
wherein the flowmeter measures flow using rotations of the helical gears;
wherein the pair of helical gears employ an oval pitch curve having two or less leaves as their reference rack tooth profile;
wherein a moving radius of the oval pitch curve is expressed by $\rho=a/(1-b\cos n\theta)$ (where "$\rho$" is the moving radius that is a distance from the center of rotation to the oval pitch curve, "a" is a similarity factor, "b" is a degree of flatness, "n" ($n \leqq 2$) is number of leaves, and "$\theta$" is an argument);
wherein when number of leaves n is 1 and a distance $g_0$ between a pole of the oval pitch curve and a pitch line is zero, the similarity factor "a" and the degree of flatness "b" are determined such that a tooth height ratio h is $\pi m/4$ (where "m" represents "tooth profile module"); in [Eq. 3]

$$\theta_0 + \alpha_0 - \tan^{-1}|-(1-b\cos\theta_0)/b\sin\theta_0|=0$$

$$a=(1-b\cos\theta_0)(h_0^2+(S_0-h_0\tan\alpha_0)^2)^{0.5}$$

$$h=a/(1-b)$$

where a cutter pressure angle at a pitch point is "$\alpha_0$", an argument at the pitch point is "$\theta_0$", a ¼ reference pitch is "$S_0$", a height of a straight line from the pitch line is "$h_0$", and the tooth height ratio is "h"; and
wherein the cutter pressure angle $\alpha_0$ is 10° or larger.

* * * * *